United States Patent [19]

Hostetler

[11] Patent Number: 5,239,944
[45] Date of Patent: Aug. 31, 1993

[54] WATER CONDUIT CONNECTOR FOR AN ANIMAL WATER SUPPLY SYSTEM

[75] Inventor: Robert D. Hostetler, Elkhart, Ind.

[73] Assignee: Avtron, Inc., Elkhart, Ind.

[21] Appl. No.: 884,801

[22] Filed: May 19, 1992

[51] Int. Cl.$^5$ .............................................. A01K 39/02
[52] U.S. Cl. ...................................... 119/72; 285/379
[58] Field of Search ................ 119/72, 72.5; 285/379, 285/345

[56] References Cited

U.S. PATENT DOCUMENTS

| 3,963,268 | 6/1976 | Widdicombe | 285/379 |
| 4,003,591 | 1/1977 | Schuldink | 285/345 |
| 4,047,739 | 9/1977 | Aitken | 285/379 |
| 4,126,339 | 11/1978 | Thompson | 285/379 |
| 4,543,912 | 10/1985 | Steudler | 119/18 |
| 4,610,063 | 9/1986 | Steudler | 29/157 |
| 4,669,422 | 6/1987 | Steudler, Jr. | 119/72 |

FOREIGN PATENT DOCUMENTS

| 2142224 | 1/1973 | France | 285/379 |
| 526329 | 9/1940 | United Kingdom | 285/379 |
| 1183881 | 3/1970 | United Kingdom | 285/379 |

Primary Examiner—Gene Mancene
Assistant Examiner—Todd E. Manahan
Attorney, Agent, or Firm—Baker & Daniels

[57] ABSTRACT

The present invention is a water conduit connector for an animal water supply system. The connector has a body which receives adjacent ends of water conduit sections. Inserts are positioned into the connector body and define pockets for positioning sealing o-rings. The inserts, o-rings, and connector body receive the conduit section ends, with the o-ring being compressed to form a sealing contact with the outer surface of the water conduit. The insert includes a ridge which engages an internal groove of the connector body to securely fasten the insert within the connector body. Tapered portions of the insert and connector body facilitate the entry of the insert into the connector body. The connector facilitates manufacture because no sonic welding is needed to complete the connector body and form the pockets in the connector body which house the o-rings.

14 Claims, 2 Drawing Sheets

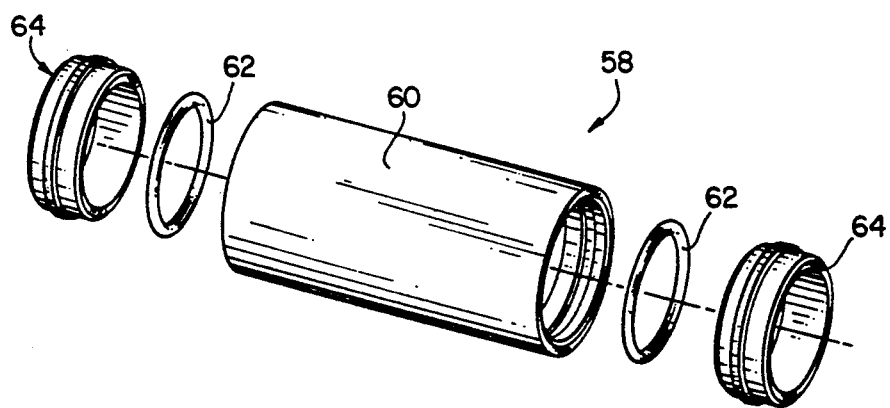
FIG. 4
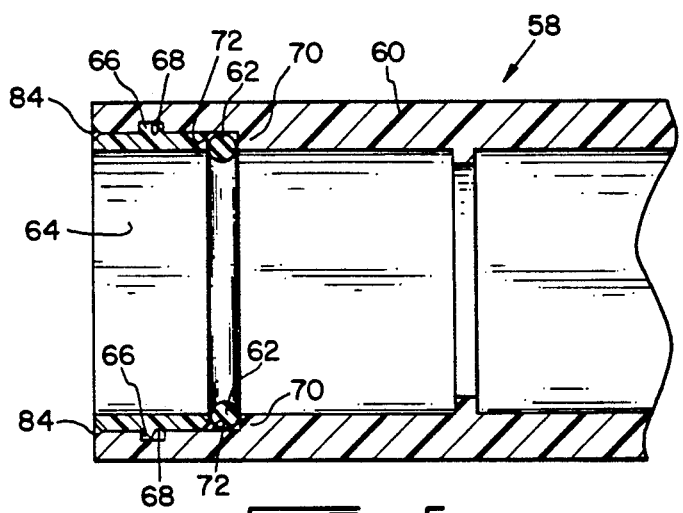
FIG. 5
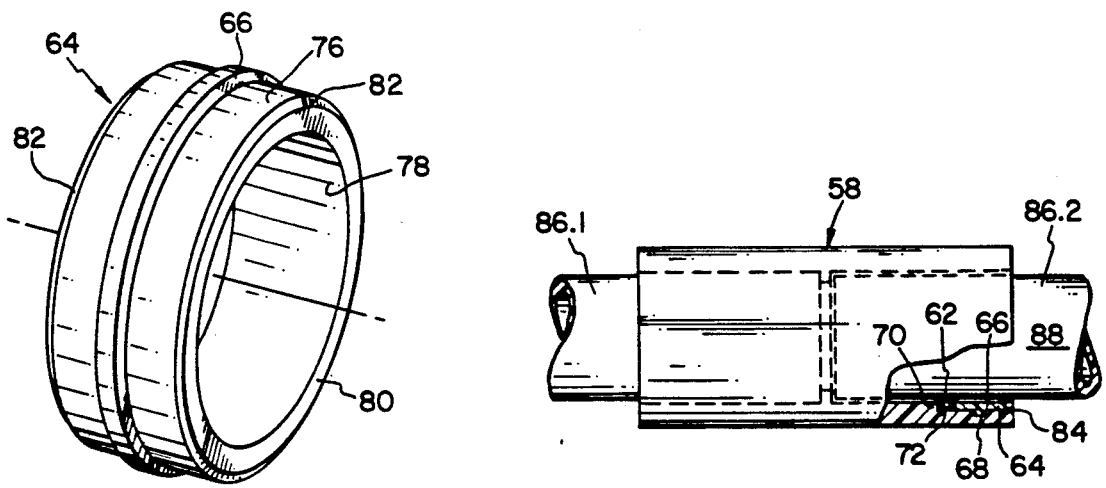
FIG. 7
FIG. 6

WATER CONDUIT CONNECTOR FOR AN ANIMAL WATER SUPPLY SYSTEM

BACKGROUND OF THE INVENTION

1. Field of the Invention

The present invention relates to animal water supply systems, particularly to water supply systems for fowl or small animals. More specifically, the field of the invention is that of connectors for coupling adjacent portions of water conduits employed in such water supply systems.

2. Prior Art

In raising fowl or small animals, the provision of water is essential for safe and efficient nurturing. With chickens, for example, water is important in terms of cost because chickens receiving more water consume less food. In addition to the chickens needing water to grow, water can provide other benefits, for example, medicine and vitamins can be added to provide the chickens beneficial nutrients. However, problems with the water supply can adversely affect the chickens. Leakage in the water supply system can foster bacteria growth and infection, and left unchecked can flood the hen house and drown the chickens. Therefore, water accumulating on the floors of the hen house should be avoided. Even if only small leakage is present, for example by a bad fluid connection or an improperly seated valve, then the excess water can wet the chicken and litter thus fostering bacteria and mold which may endanger the health of the chickens.

A water supply system described in U.S. Pat. Nos. 4,284,036, 4,491,088, 4,589,373, and 4,637,345 solves many of the aforementioned problems, and each of these patents is expressly incorporated by reference herein. These patents describe a valve for providing water to chickens and the like which minimizes water leakage. The valves are provided on water conduits which may be attached in rows to cages or other structures in the poultry house; alternatively, a suspended system may be used wherein the rows of water conduits are attached to the underside of a ballast pipe by a ballast and conduit connector. The valve and conduit are formed from a food grade material such as plastic or ABS material. The valve disclosed in the aforementioned patents has a tubular body with a tapered lower bore which is sealed by a pin having a head resting on a rubber cup on the inside lower surface of the valve. The pin is a shiny metallic element which attracts the attention of chickens. Normally, a chicken moves the pin with its beak, and the valve allows a small water droplet to pass so that the chicken can easily consume the droplet as it flows down the pin.

In a suspended system, the ballast pipe may be a rigid elongate element, such as a galvanized steel pipe. The pipe and ballast connector holds the conduit in spaced relation below the pipe. The top of the pipe and conduit connector is used to hold an electrically conductive cable which serves as an anti-roosting device. The pipe and conduit of each row are thus coupled together and suspended from the ceiling of facility by a hanger system such as disclosed in U.S. Pat. No. 5,048,462, entitled "HANGER FOR WATER SUPPLY SYSTEM AND METHOD OF INSTALLATION", assigned to the assignee of the present invention, the disclosure of which is explicitly incorporated by reference.

For each row of the animal water supply system, two or more adjacent sections of the water conduit may be fluidly coupled by connectors. FIGS. 2 and 3 show prior art water conduit connector 20 which is adapted to receive and fluidly couple adjacent ends of two water conduit sections. In the unassembled state (FIG. 2), connector 20 includes five components: cylindrical body 22, two o-rings 24, and two end caps 26. When assembled (FIG. 3), o-rings 24 are located in pockets 28 which are formed between end caps 26 and internal shoulders 30 of body 22. Also, connector body 22 defines separating portion 32 in its middle to prevent direct abutment of conduit ends 34. Further, with conduit end 32 inserted within body 22 and extending past shoulder 30, o-ring 24 is compressed within pocket 28 to form a fluid seal with conduit outer surface 36.

In order to attach end caps 26 to connector body 22, end caps 26 are fitted into each end 38 of body 22. Caps 26 include an outer rim 26.1 which extends to the outer diameter of body 22, inner extension 26.2 which is received within the inner diameter of end 38, and bead 26.3 located at the juncture of rim 26.1 and extension 26.2. During sonic welding, bead 26.3 may supply material for the coalescence between the outer diameter of extension 26.2 and the inner diameter of end 38 and thereby aids in bonding the two pieces together, generally along the dotted line of FIG. 3. Extension 26.2 does not extend to and abut shoulder 30, instead pockets 28 are created between shoulders 30 and their respective extensions 26.2 for locating o-rings 24 within the inner surface of body 22. Ends 38 and end caps 26 are thereby secured together by sonic welding to define pockets 28.

The process of assembling connector 20 is labor intensive and therefor significantly adds to its cost. First, one cap 26 is inserted into end 38 and manually placed in a sonic welding device in order to bond cap 26 to end 38. Next, body 22 is removed from the sonic welding device and the one end 38 is finished. Then, another cap 26 is manually inserted into the other end 38 and manually placed in the sonic welding device to bond cap 26 to the other end 38. After the second sonic welding, body 22 is removed and the other end 38 is finished. Also, o-rings 24 are located into pockets 28 to complete the assembly of connector 20. Thus, each connector 20 must be sonically welded twice in order to secure caps 26 to body 22.

Although injection molding a single piece is preferred over sonically welding three pieces together, conventional injection molding techniques are unable to form pockets having a sufficiently large size to hold the o-rings. In order to form such pockets and thereby securely position the sealing ring, the more expensive sonic weld process is required.

On larger water supply systems, several water conduit connectors may be needed on each row to couple sections of the water conduit. The cost of the water conduit connectors is a significant portion of the total cost of the water supply system. Thus, lowering the manufacturing cost of the water conduit connectors may significantly reduce the cost of a water supply system.

What is needed is a water conduit connector which may be more efficiently produced.

Also needed is a water conduit connector which does not require sonic welding as part of its manufacturing process.

SUMMARY OF THE INVENTION

The present invention is an improved water conduit connector for animal water supply systems. The inventive connector provides a fluid coupling between adjacent sections of the water conduit as does the prior art connector, but the inventive connector does not require sonic welding, and is therefore less costly to manufacture. The injection molded components of the inventive connector are connected by an interference fit which may be easily done during installation of the system, so that the assembly process is greatly simplified.

The connector has a generally cylindrically shaped body with open ends for receiving the ends of the water conduit sections. The o-rings are located in pockets of the insert, with the pockets being defined by a shoulder of the connector body on one side and a generally cylindrical insert on the other side. The inserts are inserted into the open ends of the connector body, to form an interference fit with a groove formed in an internal wall of the connector body. This simplified assembly process may be done at the installation site itself, rather than at the factory which is generally required for the sonically welded connector. The assembled connector receives the ends of the water conduits and forms a seal with the outer surface of the conduit, and is less expensive than prior art water conduit connectors used with water supply systems.

The manufacturing cost of the connectors is decreased by the design of the present invention. The internal grooves in the interior wall are sufficiently small so that the connector body may be injection molded. The inserts may be manually secured inside the connector body, with tapered surfaces of the insert and body end facilitating sliding the insert into the body end. Another advantageous feature of the invention is the symmetrical shape of the insert, which allows either end of the insert to slide into either end of the body and have the ridge snap into the internal groove of the body end. By snapping into the grooves, the insert forms an interference fit with the connector body, fixedly engaging the connector body and forming pockets for the o-rings. The o-rings may be located adjacent to the shoulder of the connector body prior to snapping in the inserts, or alternatively may be located in the pockets after insertion of the insert.

The present invention, in one form thereof, is a water supply system for fowl or small animals including a conduit, drinker valves, and a water conduit connector. The conduit transmits water and includes a plurality of conduit sections disposed along a common axis. The drinker valves are disposed on the conduit, and each drinker valve includes a valve body and a pin. The valve body regulates water flow through the drinker, and the pin extends from the valve body and is adapted to selectively actuate the valve. With this arrangement, each drinker is adapted to selectively dispense water when the pin is manipulated by a fowl or small animal. The water conduit connector fluidly couples adjacent water conduit sections, and includes a cylindrical body, two cylindrically shaped inserts, and two sealing rings. The cylindrical body has two end portions which receive the conduit sections, with the inserts frictionally engaging respective end portions and retaining the sealing rings within the cylindrical body.

On object of the invention is to provide a water conduit connector which may be more efficiently produced.

Also an object is to provide a water conduit connector which does not require sonic welding in its manufacture.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 4 is an exploded perspective view of a water conduit connector of the present invention.

FIG. 5 is an enlarged, sectional view of one end of the connector of FIG. 4 assembled.

FIG. 6 is a side elevational view, in partial cut-away, of the connector of FIG. 5 coupled with water conduits.

FIG. 7 is an enlarged perspective view of an insert of FIG. 4.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
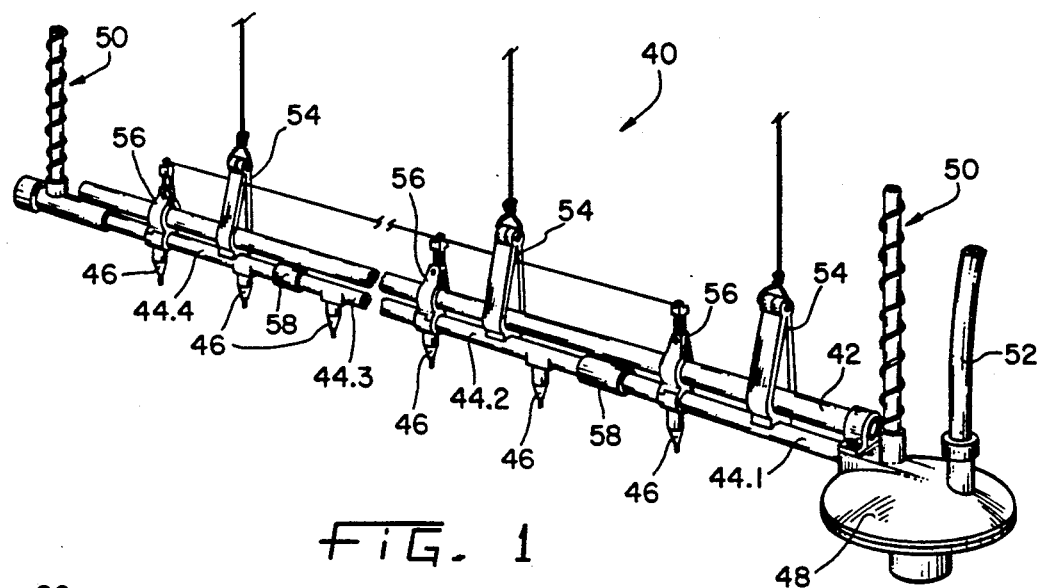
FIG. 1 is a perspective view of a water supply system having water conduit connectors.
Figure 2:
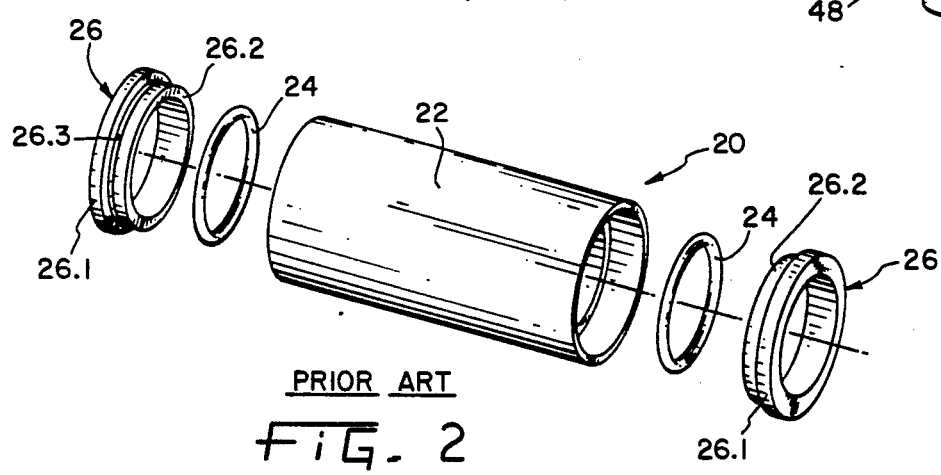
FIG. 2 is an enlarged, exploded perspective view of a prior art water conduit connector.
Figure 3:
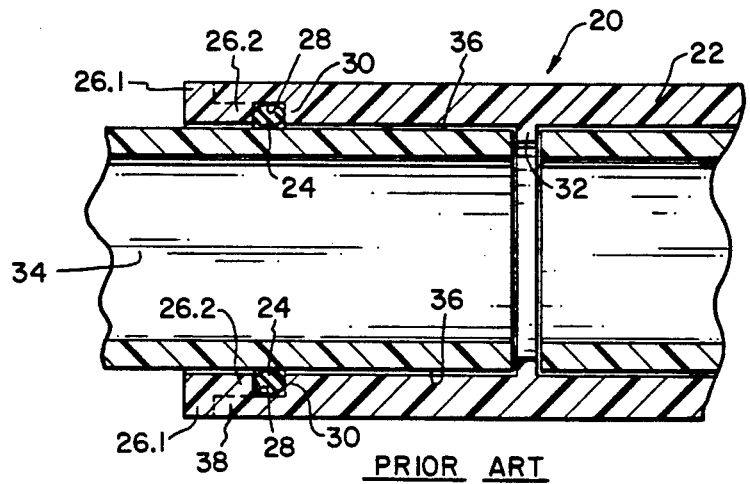
FIG. 3 is a sectional view of one end of the prior art connector of FIG. 2 assembled and connecting two water conduit sections.

The present invention relates to water supply systems for fowl and small animals, such as chickens. FIG. 1 shows chicken water supply system 40 generally including ballast pipe 42, water conduit sections 44.1-4, a plurality of drinker valves 46, regulator 48, pressure gauges 50, input line 52, hangers 54, and ballast and conduit connectors 56. Drinker valves 46 are formed on water conduits sections 44, which are disposed adjacently along a common axis. Regulator 48 is connected to one end of conduit section 44.1 and receives water from input line 52. Regulator 48 supplies low pressure water through conduit sections 44.1-4 so that chickens may activate drinker valves 46 and receive water. Ballast pipe 42 is attached to and supports conduit sections 44 by ballast and conduit connectors 56, with hangers 54 suspending ballast pipe 42. Hangers 54 may be of the type disclosed in U.S. Pat. No. 5,048,462, entitled "HANGER FOR WATER SUPPLY SYSTEM AND METHOD OF INSTALLATION", assigned to the assignee of the present invention, the disclosure of which is explicitly incorporated by reference. Ballast and conduit connectors 56 may be of the type disclosed in copending U.S. patent application Ser. No. 07/747,863 and U.S. Design patent application Ser. No. 07/747,599, both filed Aug. 20, 1991, both entitled "CONNECTOR FOR A Water supply system", and both assigned to the assignee of the present invention, the disclosures of which are explicitly incorporated by reference.

In accordance with the present invention, water conduit connectors 58 fluidly couple adjacent water conduit sections 44. As shown in FIG. 4, water conduit connector 58 includes cylindrical body 60, two o-rings 62, and two inserts 64. When assembled as shown in FIG. 5, a peripheral edge, namely centrally located ridge 66, of insert 64 engages internal groove 68 of connector body 60 to form an interference fit. The other side of connector 58 (not shown in FIG. 5) is symmetrically arranged. The locking engagement of ridge 66 and groove 68 positions insert 64 a predetermined distance from shoulder 70 of connector body 60 and thereby defines pocket 72 for receiving o-ring 62. Separating portion 74 is located in the middle of body 60, and prevents abutment of adjacent water conduit sections (not shown in FIG. 5).

Insert 64 is generally annularly shaped and is shown with greater particularity in FIG. 7. Ridge 66 extends from generally cylindrical outer surface 76. Internally, generally cylindrical inner surface 78 is adapted to receive a water conduit. Axial surface 80 is generally perpendicular to the axial center of insert 64, and when facing inwardly in body 60 defines one side of pocket 72. Also, axial surface 80 and outer surface 76 are connected by tapered surface 82. Insert 64 is symmetrical, so each side of insert 64 has identically arranged exterior surfaces allowing for insertion in either axial direction.

Connector 58 is assembled by locating inserts 64 and o-rings 62 within connector body 60. Insert 64 is positioned adjacent an open end and is forced into body 60. Tapered surfaces 82 and 84, of insert 64 and body 60, respectively, facilitate the initial entry of insert 64 into body 60. The symmetrical arrangement of insert 64 allows it to be oriented in either direction prior to insertion. Although insert 64 frictionally engages body 60, the smooth exterior of outer surface 76 allows further inward sliding of insert 64. Insert 64 may be moved further inward until ridge 66 snaps into groove 68 to form an interference fit. O-ring 62 may then be placed within pocket 72 which is formed between axial surface 80 of insert 64 and the axial periphery of shoulder 70 of body 60. Alternatively, o-ring 62 may initially be located within body 60 adjacent to shoulder 70 and then insert 64 may be installed to define pocket 72. The same procedure is repeated for the other side of connector body 60, which has a symmetrical arrangement at each end to receive insert 64.

Once connector 58 is assembled, two water conduit sections may be fluidly coupled by inserting conduit end 86.1 into one side of connector 58 and conduit end 86.2 into the other side of connector 58 as shown in FIG. 6. First, conduit end 86 is slid into insert 64; next, conduit end 86 contacts and compresses o-ring 62 within pocket 72 to form a seal between outer surface 88 and o-ring 62. The smooth exterior of outer surface 88 allows conduit end 86 to keep sliding into connector body 60 until end 86 is close to or abutting separating portion 74. After both conduit ends 86 are inserted into connector 58, a sealed fluid coupling is formed between the two coaxial, adjacent water conduit sections.

In the preferred embodiment, connector body 60 is made from material such as polypropylene or other food grade material. O-rings 62 are made from conventional materials for sealing rings such as polychloroprene, for example available commercially as neoprene from Du Pont, and may be of a similar size and shape as the o-rings used with the aforementioned prior art water conduit connectors. Inserts 64 are made from material such as polypropylene; however, less expensive non-food grade materials may be used because water flowing through the coupled conduit sections do not contact inserts 64. The depth of groove 68 is preferably 0.3 mm, while the height or ridge 66 is preferably 0.45 mm above generally cylindrical outer surface 72 which preferably has an outer diameter of about 26.45 mm. Tapered surface 82 is preferably disposed at an angle of about 30° relative to the axial center line of insert 64. Connector body 60 and inserts 64 are preferably made by injection molding. The connector itself preferably has a length of between 60 and 70 mm. The connector is adapted to couple water conduit sections having an outer diameter of about 22.5 mm. Also, the outer diameter of the connector is preferably 31.5 mm. Although specific values have been disclosed for use with conventional water conduit tubing, the present invention may be adapted for use with many other sizes of water conduit tubing.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A water supply system for fowl or small animals, said water supply system comprising:
    a conduit for transmitting water, said conduit including a plurality of conduit sections disposed along a common axis;
    a plurality of drinker valves disposed on said conduit, each said drinker valve including a valve body and a pin, said valve body regulating water flow through said drinker valve, said pin extending from said valve body and adapted to selectively actuate said valve body, each said drinker valve adapted to selectively dispense water when said pin is manipulated by a fowl or small animal; and
    a connector for fluidly coupling adjacent ones of said conduit sections, said connector including a cylindrical body, two cylindrically shaped inserts, and two sealing rings, said cylindrical body having two end portions receiving said conduit sections, said inserts frictionally engaging respective said end portions and retaining said sealing rings within said cylindrical body, each said insert including a peripheral edge which forms an interference fit with said respective end portion, each said insert including an outer cylindrical surface, and said peripheral edge of each said insert being centrally disposed on said outer surface of said insert.

2. The water supply system of claim 1 wherein each said end portion of said connector body includes an internal groove, and each said respective peripheral edge lockingly engages said respective internal groove.

3. The water supply system of claim 1 wherein said body includes a shoulder portion adjacent each said end portion, said shoulder portion is spaced from said respective insert, the axial peripheries of each said shoulder portion and said respective insert define a pocket within said body, and each said pocket receives one of said sealing rings.

4. The water supply system of claim 3 wherein each said sealing ring is compressed in said respective pocket by said conduit sections.

5. The water supply system of claim 1 wherein each said insert is disposed completely within said respective end portion.

6. A water supply system for fowl or small animals, said water supply system comprising:
   a conduit for transmitting water, said conduit including a plurality of conduit sections disposed along a common axis;
   a plurality of drinker valves disposed on said conduit sections for selectively dispensing water from said conduit;
   ballast means for supporting said conduit;
   means for attaching said ballast means and said conduit; and
   a connector for fluidly coupling adjacent ones of said conduit sections, said connector including a cylindrical body, two cylindrically shaped inserts, and two sealing rings, said cylindrical body having two end portions for receiving said conduit sections, said inserts frictionally engaging respective said end portions and retaining said sealing rings within said cylindrical body, each said insert including a peripheral edge which forms a locking interference fit with said respective end portion, each said insert including an outer cylindrical surface, and said peripheral edge of each said insert being centrally disposed on said outer surface of said insert.

7. The water supply system of claim 6 wherein each said end portion of said connector body includes an internal groove, and each said respective peripheral edge lockingly engages said respective internal groove.

8. The water supply system of claim 6 wherein said body includes a respective shoulder portion adjacent each said end portion, said respective shoulder portions are spaced from said respective inserts, the axial peripheries of each said shoulder portion and said respective insert define a pocket within said body, and each said pocket receives one of said sealing rings.

9. The water supply system of claim 8 wherein each said sealing ring is compressed in said respective pocket by said conduit sections.

10. The water supply system of claim 6 wherein each said insert is disposed completely within said respective end portion.

11. A method of fabricating a water conduit connector adapted to fluidly couple two adjacent, coaxial water conduit sections, said method comprising the steps of:
    providing a cylindrical connector body having two open ends;
    providing two cylindrical inserts and two sealing rings, said inserts including a peripheral edge which is centrally located on the outer surface of each said insert;
    inserting said inserts into corresponding ones of said open ends and frictionally engaging each said insert with a corresponding one of said ends and forming an interference fit, and said inserts may be inserted into said connector body in either direction; and
    retaining each said sealing ring within said connector body adjacent a respective one of said inserts.

12. The method of claim 11 wherein each said end portion of said connector body includes an internal groove, and said inserting step includes lockingly engaging each said peripheral edge with said corresponding internal groove.

13. The method of claim 11 wherein said inserting step includes locating said inserts completely within said corresponding end portions.

14. The method of claim 11 wherein a pocket is defined between each said insert and said corresponding end portion, and said retaining step includes locating one of said sealing rings within each said pocket.

* * * * *